(12) United States Patent
Wright et al.

(10) Patent No.: US 6,979,364 B2
(45) Date of Patent: Dec. 27, 2005

(54) METAL CHELATE COMPOUNDS AND INKS

(75) Inventors: Gavin Wright, Blackley (GB); Kevin Johnson, Preston (GB); Mairi Elizabeth Raggatt, Summertown (GB); Prakash Patel, Blackley (GB)

(73) Assignee: Avecia Limited, Manchester (GB)

( * ) Notice: Subject to any disclaimer, the term of this patent is extended or adjusted under 35 U.S.C. 154(b) by 93 days.

(21) Appl. No.: 10/441,286

(22) Filed: May 20, 2003

(65) Prior Publication Data

US 2004/0020405 A1 Feb. 5, 2004

Related U.S. Application Data

(60) Provisional application No. 60/410,806, filed on Sep. 16, 2002.

(30) Foreign Application Priority Data

Jul. 27, 2002 (GB) ............................................. 0217442

(51) Int. Cl.$^7$ .......................... C09D 11/00; C09B 45/00; C09B 33/00; B41J 2/01
(52) U.S. Cl. ................... 106/31.5; 106/31.78; 534/707; 534/726; 548/101; 347/100
(58) Field of Search ............................ 106/31.5, 31.78; 534/707, 726; 548/101; 347/100

(56) References Cited

U.S. PATENT DOCUMENTS

| | | | |
|---|---|---|---|
| 3,321,266 A | | 5/1967 | Wunderlich et al. ............. 8/42 |
| 3,468,871 A | * | 9/1969 | Gottschlich Alois et al. ..... 534/697 |
| 4,023,830 A | * | 5/1977 | Skelly et al. ................ 503/201 |
| 4,204,879 A | | 5/1980 | Paskins et al. ............... 106/311 |
| 5,102,459 A | | 4/1992 | Ritter et al. ............. 106/31.51 |
| 5,183,501 A | | 2/1993 | Kawashita et al. ....... 106/31.48 |
| 5,691,458 A | * | 11/1997 | Arnost et al. ............... 534/774 |
| 5,980,622 A | | 11/1999 | Byers ....................... 106/31.48 |
| 6,001,161 A | | 12/1999 | Evans et al. ............. 106/31.48 |
| 6,755,903 B2 | * | 6/2004 | Yamada et al. .......... 106/31.45 |
| 6,827,770 B2 | * | 12/2004 | Chino et al. ............. 106/31.46 |
| 2004/0020404 A1 | * | 2/2004 | Popat et al. ................ 106/31.5 |
| 2004/0027399 A1 | * | 2/2004 | Wright et al. ................... 347/1 |

FOREIGN PATENT DOCUMENTS

| | | |
|---|---|---|
| DE | 651105 | 10/1937 |
| EP | 1 270 676 A1 | 1/2003 |
| JP | 48-089932 | 11/1973 |
| JP | 58-176267 | 10/1983 |
| JP | 10-259331 | 9/1998 |
| JP | 11-005931 | 1/1999 |

OTHER PUBLICATIONS

Hirsch et al., Sbornik Vedeckych Praci, Vysoka Skola Chemickotechnologicaka Pardubice, 44:285–290 (1992), no month avail.

Israilov et al., Izvestiya Akademii Nauk Tadzhikskoi SSR, Otdelenie, 79(1):45–51 (1981), no month avail.

Sheberbachev et al, Revue Generale Des Matieres Colorantes, Du Blanchiment, De La Teinture, De L'Impression Et Des Apprets, 39(81–6):81–86 (1935), no month.

Garg et al., Synth. React. Inorg. Met–Org. Chem., 18(7):643–656 (1988), no month available.

Caber et al., Indian Journal of Textile Research, 11:48–51 (Mar., 1986).

\* cited by examiner

*Primary Examiner*—Helene Klemanski
(74) *Attorney, Agent, or Firm*—Morgan, Lewis & Bockius LLP

(57) ABSTRACT

A metal chelate compound of the Formula (1) and salts thereof:

Formula (1)

$$\left[\begin{array}{c}\text{naphthalene with A, B, and }(SO_3H)_n\end{array}\right] M$$

wherein:
one of A and B is OH and the other is an azotriazole group; and
M is a metal or boron; and
n is 0 to 4; compositions and inks containing a compound of Formula (1), a process for ink jet printing using the inks and an ink jet printer cartridge containing the ink.

12 Claims, No Drawings

METAL CHELATE COMPOUNDS AND INKS

This application claims priority of copending provisional application No. 60/410,806 filed Sep. 16, 2002 and UK Application No. 02174422.3, filed Jul. 27, 2002.

This invention relates to dyes, to inks and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

WO 01/48090 relates to metal chelate azo compounds which comprise a naphthol component and certain heterocyclic groups. WO 01/48090 does not disclose such compounds further substituted by a triazole ring.

According to a first aspect of the present invention there is provided a metal chelate compound of the Formula (1) and salts thereof:

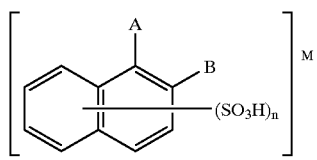

Formula (1)

wherein:
one of A and B is OH and the other is an azotriazole group; and
M is a metal or boron; and
n is 0 to 4.

Preferred azotriazole groups are of the Formula (2a), (2b), (2c), (2d) or (2e):

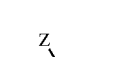

Formula (2a)

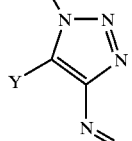

Formula (2b)

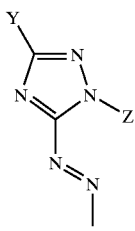

Formula (2c)

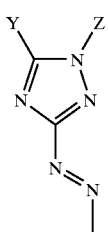

Formula (2d)

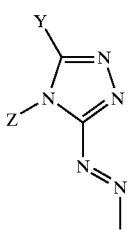

Formula (2e)

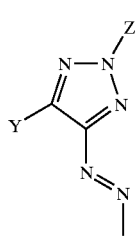

wherein:
Z is H, —OH, —Br, —Cl, —F, —CN, —NO$_2$, —PO$_3$H$_2$, —SO$_3$H, —CO$_2$H, optionally substituted phosphoramide, optionally substituted alkyl, optionally substituted alkenyl, optionally substituted alkynyl, optionally substituted aryl, optionally substituted aralkyl, —SR$^1$, —SO$_2$R$^1$, —SO$_2$NR$^2$R$^3$, —SOR$^1$, —OR$^1$, —C(O)R$^1$, —C(O)OR$^1$, —C(O)NR$^2$R$^3$, —NR$^2$R$^3$, —NHCOR$^1$; and
Y is CF$_3$ or any one of the groups defined for Z; and
wherein:
R$^1$, R$^2$ and R$^3$ are each independently H, optionally substituted alkyl, optionally substituted alkenyl, optionally substituted alkynyl, optionally substituted aryl or optionally substituted aralkyl; or
R$^2$ and R$^3$ together with the nitrogen to which they are attached form an optionally substituted 5- or 6-membered ring.

When Y or Z is optionally substituted phosphoramide the phosphoramide is preferably substituted by optionally substituted alkyl, optionally substituted aryl or optionally substituted aralkyl. Preferred substituents include for example methyl, ethyl, n-propyl, iso-propyl, hydroxyethyl, optionally substituted phenyl or optionally substituted benzyl.

When Y or Z is optionally substituted alkyl, the alkyl group is preferably optionally substituted C$_{1-4}$-alkyl, more preferably C$_{1-4}$-alkyl optionally substituted by halo, hydroxy, carboxy, sulpho or cyano. Examples include methyl, ethyl, n-propyl, iso-propyl, trifluoromethyl, hydroxyethyl, cyanoethyl, sulphopropyl and carboxyethyl. However, when Y or Z is optionally substituted alkyl it is especially preferred that the alkyl group is methyl, ethyl or trifluoromethyl.

When Y or Z is optionally substituted alkenyl, Y or Z is preferably optionally substituted C$_2$–C$_4$ alkenyl.

When Y or Z is optionally substituted alkynyl, Y or Z is preferably optionally substituted C$_2$–C$_6$ alkynyl.

When Y or Z is optionally substituted aryl the aryl group is preferably optionally substituted phenyl, optionally substituted naphthyl or optionally substituted heteroaryl. It is especially preferred that when Y is optionally substituted aryl it is optionally substituted phenyl or optionally substituted heteroaryl.

Preferred optional substituents on Y when Y is optionally substituted aryl include sulpho, carboxy, nitro, cyano, halo (preferably chloro), alkoxy (preferably $C_{1-6}$-alkoxy), alkyl ((preferably $C_{1-6}$-alkyl) optionally substituted by halogen (preferably fluoro), hydroxy, carboxy, phosphoric acid and sulpho. Especially preferred optional substituents on Y when Y is optionally substituted aryl are selected from $C_{1-4}$-alkyl, carboxy, phosphoric acid and sulpho. However, it is most preferred that when Y is optionally substituted aryl that the aryl group is substituted by carboxy.

Preferred optional substituents on Z when Z is optionally substituted aryl include sulpho, carboxy, nitro, cyano, halo (preferably chloro), alkoxy (preferably $C_{1-6}$-alkoxy), alkyl (preferably $C_{1-6}$-alkyl) optionally substituted by halogen (preferably fluoro), hydroxy, carboxy, phosphoric acid and sulpho. Especially preferred optional substituents on Z as optionally substituted aryl are selected from carboxy or halogen (preferably chloro).

When Y or Z is optionally substituted aralkyl the aralkyl group is preferably optionally substituted benzyl.

However, Y in Formulae (2a), (2b), (2c), (2d) or (2e) is most preferably H, thiol, carboxy, halo (preferably chloro), alkyl ((preferably $C_{1-6}$-alkyl) optionally substituted by hydroxy, carboxy, halo (preferably fluoro) or sulpho. It is especially preferred that Y in Formulae (2a) to (2e) is H, $C_{1-4}$-alkyl or carboxy or sulpho. However, it is most especially preferred that Y is H or $CO_2H$.

Z in Formulae (2a) to (2e) is preferably H, ethylester or alkyl (preferably $C_{1-4}$-alkyl) optionally substituted by hydroxy, carboxy, halo (preferably fluoro) or sulpho. It is especially preferred that Z in Formulae (2a) to (2e) is H or $C_{1-4}$-alkyl. However, it is most especially preferred that Z is H.

$R^1$, $R^2$ and $R^3$ are preferably each independently H, optionally substituted $C_{1-4}$-alkyl or optionally substituted aryl, more preferably H, $C_{1-4}$-alkyl optionally substituted by hydroxy, carboxy, sulpho or cyano or phenyl optionally substituted by hydroxy, carboxy, sulpho, nitro, trifluoromethyl or cyano. Examples of groups represented by $R^1$, $R^2$ and $R^3$ include methyl, ethyl, n-propyl, iso-propyl, hydroxyethyl, cyanoethyl, sulphopropyl, carboxyethyl or carboxyphenyl. It is especially preferred however that $R^1$, $R^2$ and $R^3$ are H, optionally substituted $C_{1-4}$-alkyl for example, trifluoromethyl, hydroxyethyl or cyanoethyl, or optionally substituted aryl for example phenyl optionally substituted by carboxy; or $R^2$ and $R^3$ together with the nitrogen to which they are attached form a 5- or 6-membered ring (preferably morpholine, piperidine or piperazine).

M preferably comprises boron or one or more of the following metals: nickel, chromium, cobalt, copper, zinc, iron or manganese. The metal M, is preferably able to coordinate to the portion of the compound of Formula (1) within square brackets in the ratio 1:1, 2:1, 2:2, 2:3 respectively. However, it is particularly preferred that M is nickel. It is also preferred that M is able to co-ordinate to the portion of the compound of Formula (1) within square brackets in the ratio 1:1 and 2:1.

It is preferable that n is 0, 1, 2 or 3 more preferably 1, 2 or 3, especially 1 or 2.

It is especially preferred that the compound of Formula (1) is a metal chelate compound of the Formula (3) or (4):

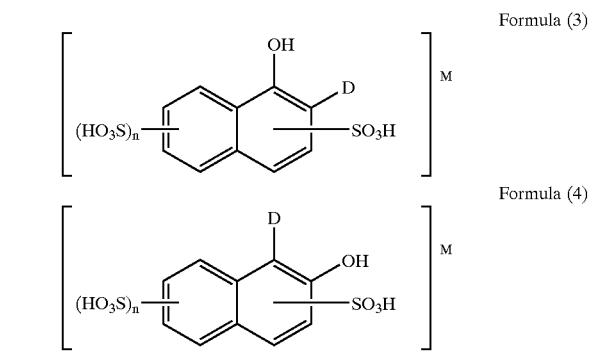

wherein D is an azotriazole group, preferably of Formula (2a), (2b), (2c), (2d) or (2e) as hereinbefore defined; n is 1 or 2; and M is nickel.

When the metal chelate compound is of Formula (3), it is preferred that there is one sulphonic acid group at the 4-position on the naphthylene and one sulphonic acid group at the 8-position on the naphthylene ring, relative to D being at the 2-position on the naphthylene ring.

When the metal chelate compound is of Formula (4), it is preferred that there is one sulphonic acid group at the 3-position on the naphthylene ring and one sulphonic acid group at the 7-position on the naphthylene ring, relative to D being at the 1-position.

In view of the foregoing preferences the compound of Formula (1) is preferably a metal chelate compound of the Formula (5) or (6) or a salt thereof:

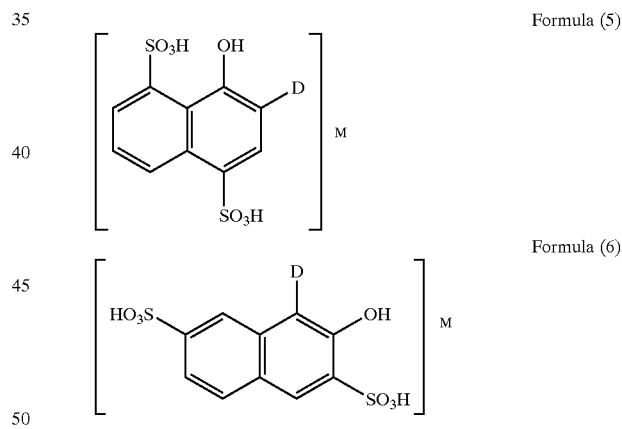

wherein:

D is a group of Formula (2a), (2b), (2c), (2d) or (2e) as hereinbefore defined and preferred, M is a metal, more preferably nickel.

When D is a group of Formula (2a), (2b), (2c), (2d) or (2e), Y is preferably H or $CO_2H$ and Z is preferably H.

It is especially preferred that the compounds of Formula (1) are magenta in colour.

The compounds of Formula (1) provide prints which exhibit a high light-fastness and good optical density when incorporated into inks for ink jet printing. The compounds of Formula (1) are also highly soluble which improves operability and reduces crusting and nozzle blockage when inks containing the compounds are used in an ink jet printer.

Compounds of Formula (1) are preferably free from fibre reactive groups. The term fibre reactive group is well known in the art and is described for example in EP 0356014 A1. Fibre reactive groups are capable, under suitable conditions, of reacting with the hydroxyl groups present in cellulosic fibres or with the amino groups present in natural fibres to form a covalent linkage between the fibre and the dye. As examples of fibre reactive groups excluded from the compounds of Formula (1) there may be mentioned aliphatic sulphonyl groups which contain a sulphate ester group in the beta-position to the sulphur atom, e.g. beta-sulphatoethylsulphonyl groups, alpha, beta-unsaturated acyl radicals of aliphatic carboxylic acids, for example acrylic acid, alpha-chloro-acrylic acid, alpha-bromoacrylic acid, propiolic acid, maleic acid and mono- and dichloro maleic; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha, beta-dichloro- and dibromopropionic acids or radicals of vinylsulphonyl- or beta-chloroethylsulphonyl- or beta-sulphatoethyl-sulphonyl-endo-methylene cyclohexane carboxylic acids. Other examples of cellulose reactive groups are tetrafluorocyclobutyl carbonyl, trifluoro-cyclobutenyl carbonyl, tetrafluorocyclobutylethenyl carbonyl, trifluorocyclobutenylethenyl carbonyl; activated halogenated 1,3-dicyanobenzene radicals; and heterocyclic radicals which contain 1, 2 or 3 nitrogen atoms in the heterocyclic ring and at least one cellulose reactive substituent on a carbon atom of the ring.

The compounds of Formula (1) may be in the free acid or salt form. Preferred salts are water-soluble, for example alkali metal salts, especially lithium, sodium, potassium, ammonium, substituted ammonium and mixed salts thereof. Preferred alkali metal salts are those with sodium, lithium, ammonium and substituted alkyl ammonium salts.

Preferred ammonium and substituted alkyl ammonium salts have cations of the formula $^+NV_4$ wherein each V independently is H or optionally substituted alkyl, or two groups represented by V are H or optionally substituted alkyl and the remaining two groups represented by V, together with the N atom to which they are attached, form a 5- or 6-membered ring (preferably a morpholinyl, pyridinyl or piperidinyl ring).

Preferably each V independently is H or $C_{1-4}$-alkyl, more preferably H, —$CH_3$ or $CH_3CH_2$—, especially H.

Examples of cations include $^+NH_4$, morpholinium, piperidinium, pyridinium, $(CH_3)_3N^+H$, $(CH_3)_2N^+H_2$, $H_2N^+(CH_3)(CH_2CH_3)$, $CH_3N^+H_3$, $CH_3CH_2N^+H_3$, $H_2N^+(CH_2CH_3)_2$, $CH_3CH_2CH_2N^+H_3$, $(CH_3)_2CHN^+H_3$, $N^+(CH_3)_4$, $N^+(CH_2CH_3)_4$, N-methyl pyridinium N,N-dimethyl piperidinium and N,N-dimethyl morpholinium.

It is especially preferred that the compound is in the form of a sodium, lithium, potassium, ammonium or substituted ammonium salt.

Preferably the metal chelate compound is not a copper or nickel chelate of any of Ligands a to e or any salt thereof:

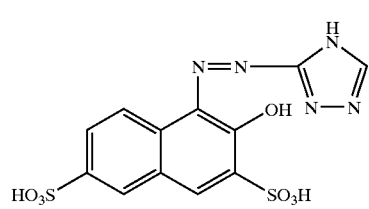

Ligand a

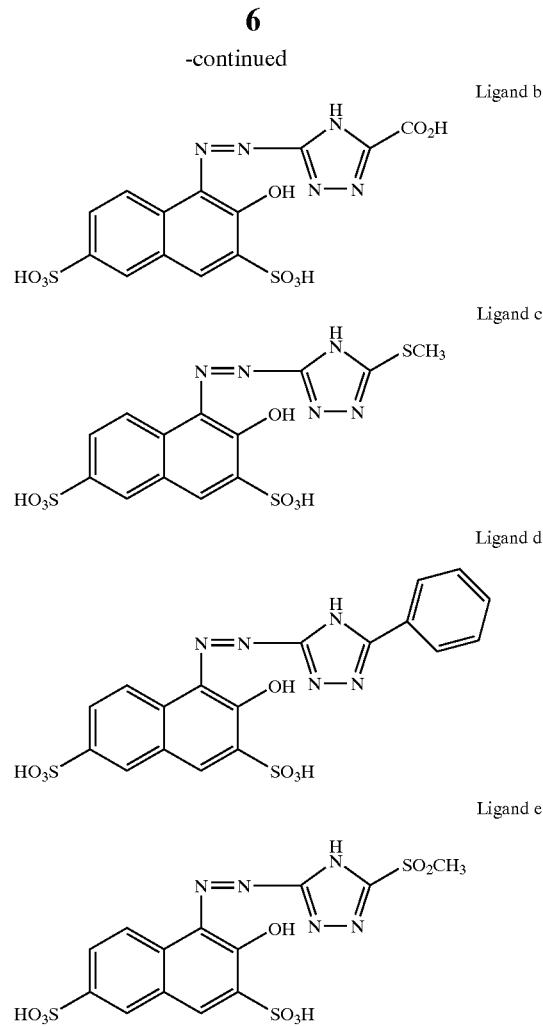

Ligand b

Ligand c

Ligand d

Ligand e

Preferably the metal chelate compound is not a chrome chelate of Ligand f or any salt thereof:

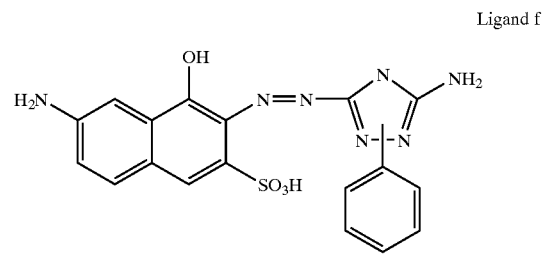

Ligand f

Preferably the metal chelate compound is not a cobalt chelate of Ligands g or h or any salt thereof:

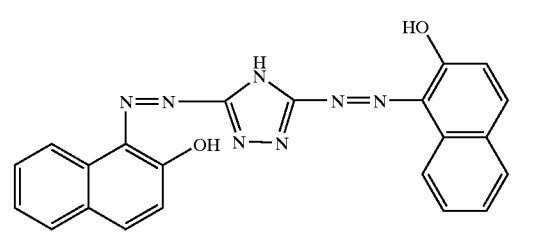

Ligand g

-continued

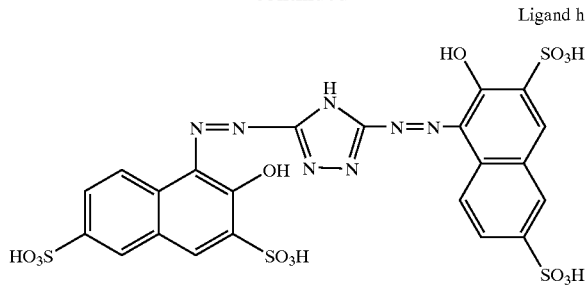

Ligand h

Preferably the metal chelate compound is not a chrome chelate of Ligand i or j or any salt thereof:

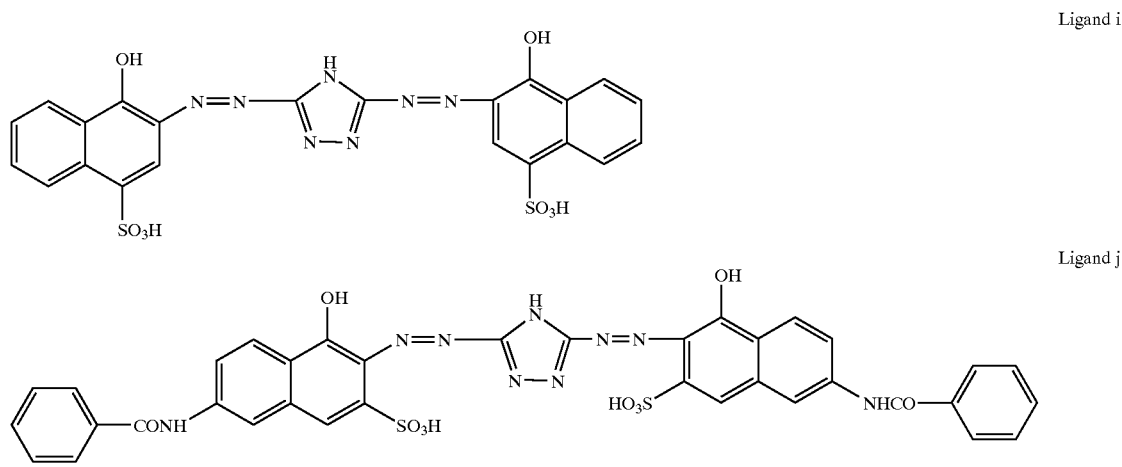

Ligand i

Ligand j

Preferably the metal chelate compound is not a metal chelate of Ligand k, l or m or any salt thereof:

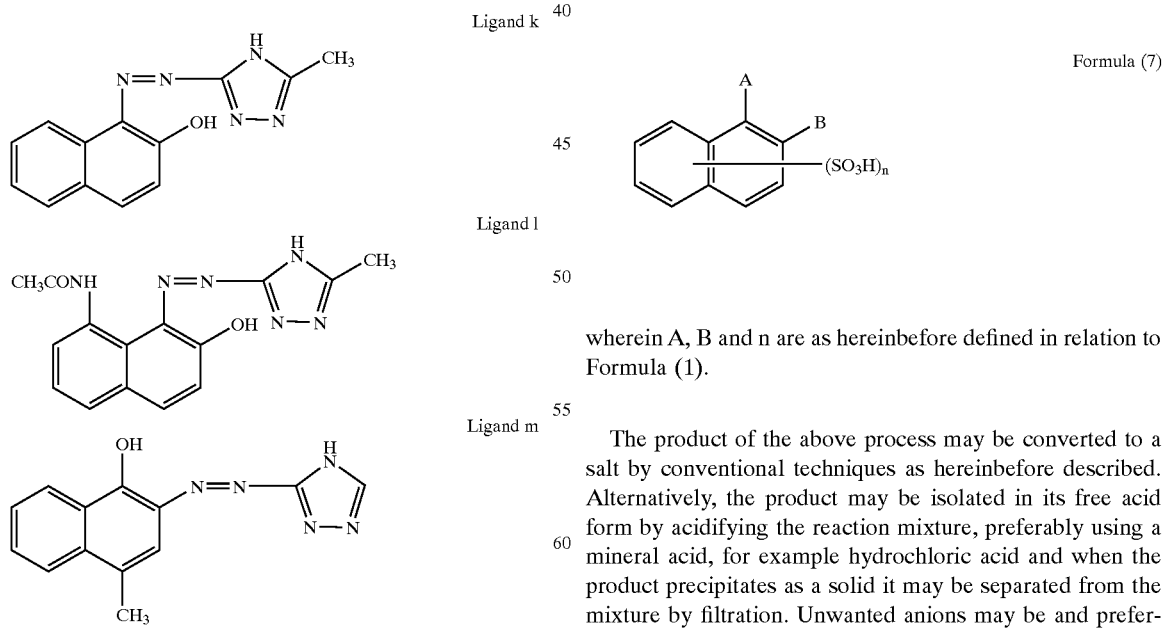

Ligand k

Ligand l

Ligand m

Preferably the metal chelate compound is not a metal chelate of any of the above Ligands f to m inclusive, more preferably a to m inclusive, or any salt thereof.

Preferably the compounds of the invention have a chroma of at least 50 when printed on plain paper.

The compounds of Formula (1) may be converted into a salt using known techniques. For example, an alkali metal salt of a compound may be converted into a salt with ammonia or an amine by dissolving an alkali metal salt of the dye in water and passing the solution through a column of a suitably modified ion exchange resin.

The compounds of Formula (1) may be prepared using conventional techniques for the preparation of metal chelate compounds. For example, a suitable method comprises adding together a metal salt and a solution of a compound of Formula (7):

Formula (7)

wherein A, B and n are as hereinbefore defined in relation to Formula (1).

The product of the above process may be converted to a salt by conventional techniques as hereinbefore described. Alternatively, the product may be isolated in its free acid form by acidifying the reaction mixture, preferably using a mineral acid, for example hydrochloric acid and when the product precipitates as a solid it may be separated from the mixture by filtration. Unwanted anions may be and preferably are removed from the product of the above process by dialysis, osmosis, ultra filtration or a combination thereof. Alternatively, the product solution is subjected to the above purification directly without isolation of the product.

The compounds of Formula (7) may be prepared by, for example, diazotising a compound of the formula $A^1$-$NH_2$ to give a diazonium salt and coupling the resultant diazonium salt with a compound of the Formula (7a):

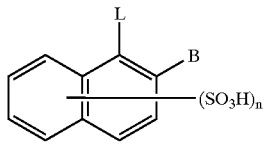

Formula (7a)

wherein $A^1$ is a triazole group, one of B and L is OH and the other is H and n is as hereinbefore defined in relation to Formula (1).

The diazotisation is preferably performed at a temperature below 6° C., more preferably at a temperature in the range −10° C. to 5° C. Preferably the diazotisation is performed in water, preferably at a pH below 7. Dilute mineral acid, e.g. HCl or $H_2SO_4$, are often used to achieve the desired acidic conditions.

The present invention also covers mixtures comprising two or more compounds of the Formula (1) or salts thereof. Furthermore, the compounds of Formula (1) may be mixed with commercially available dyes, especially those listed in the International Colour Index, to adjust the shade or other properties as desired.

According to a second aspect of the present invention there is provided a composition comprising:

(a) one or more compound according to the first aspect of the present invention; and (b) one or more water-soluble dye other than a compound according to the first aspect of the invention.

The water-soluble dye is preferably a water-soluble magenta dye, for example a xanthene dye, an azo or bis azo dye, more preferably an anionic azo or bis azo dye and especially an azo or bis azo dye which contains one or more groups selected from sulphonate, carboxylate and thiocarboxylate groups.

Preferred water-soluble magenta dyes include C.I. Acid Red 50, 52, 87, 91, 92, 95, 249 and 289; C.I. Direct Violet 106 and 107; compounds 100 to 107, 200 and 201 described on pages 8 and 9 of WO96/24636; compounds 1 to 24 shown described on columns. 4 to 10 in U.S. Pat. No. 5,542,970; compounds 1 to 55 described on pages 7 to 17 of EP-A-682 088; compounds 1 to 14 shown in Example 1 to 6 of EP-A-194,885; compounds 1 to 24 described on pages 8 to 13 of EP-A-717 089; the compounds described in examples 1 to 16 in columns. 5 to 11 of U.S. Pat. No. 5,262,527; and the dyes described in Examples 1 to 21 in WO 94/16021.

Especially preferred water-soluble magenta dyes for use in the composition according to the second aspect of the invention include C.I. Acid Red 52, C.I. Acid Red 289 or a dye of the Formula (8), (9) and (10) and salts thereof:

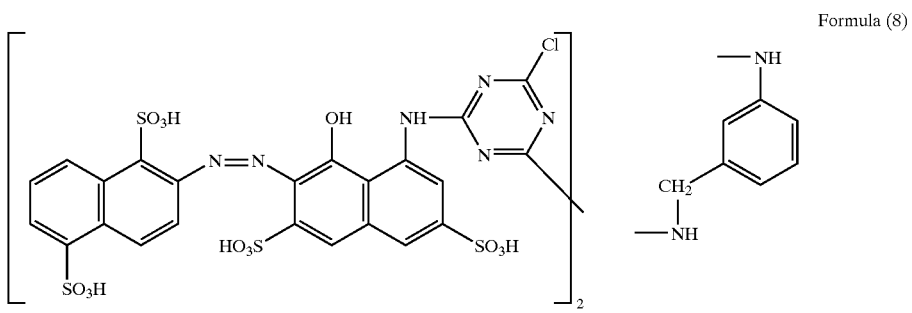

Formula (8)

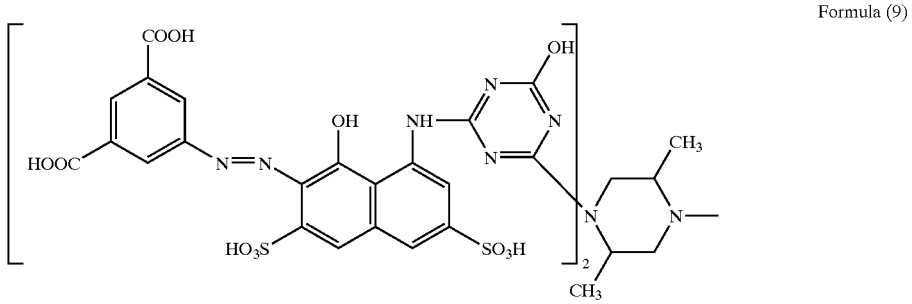

Formula (9)

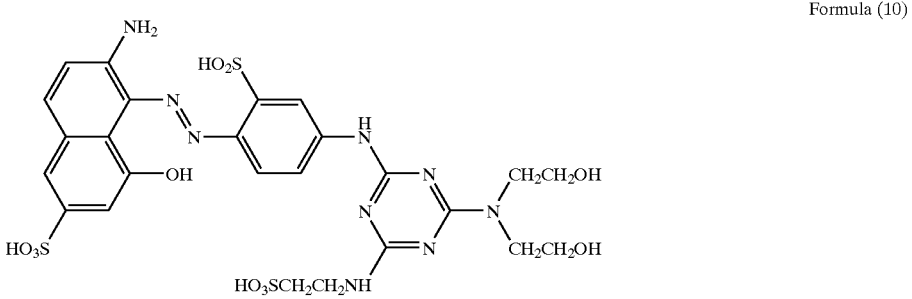

Formula (10)

The dye of Formula (8) may be prepared using the method described in Example 1 of EP 0 559 310. The dye of the Formula (9) may be prepared using the method described in Example 3 of PCT publication number WO 94/16021. The dye of Formula (10) may be prepared using the method described in Example 1 of WO 96/24636.

The composition according to the second aspect of the present invention preferably comprises:
(a) from 1 to 99, more preferably from 3 to 70 and especially from 5 to 50 parts in total of the compound(s) according to the first aspect of the invention; and
(b) from 99 to 1, more preferably from 30 to 97 parts and especially 95 to 50 parts in total of the water-soluble magenta dye(s);
wherein the parts are by weight and the sum of the parts (a)+(b)=100.

The composition may contain a single dye of Formula (1) or a mixture thereof. Similarly, the composition may contain a single water-soluble magenta dye or a mixture of two or more water-soluble magenta dyes.

The compounds and compositions according to the first and second aspects of the present invention may be, and preferably are, purified to remove undesirable impurities before they are incorporated into inks for ink jet printing. Conventional techniques may be employed for purification, for example ultrafiltration, reverse osmosis and/or dialysis.

According to a third aspect of the present invention there is provided an ink comprising:
(a) a compound according to the first aspect of the present invention, or a composition according to the second aspect of the invention; and
(b) a liquid medium.

Preferably component (a) of the ink is or comprises one of the preferred compounds or compositions as hereinbefore described in relation to the first or second aspect of the invention.

The liquid medium preferably comprises:
(i) water;
(ii) a mixture of water and an organic solvent; or
(iii) an organic solvent free from water.

The number of parts by weight of component (a) of the ink is preferably from 0.01 to 30, more preferably 0.1 to 20, especially from 0.5 to 15, and more especially from 1 to 5 parts. The number of parts by weight of component (b) is preferably from 99.99 to 70, more preferably from 99.9 to 80, especially from 99.5 to 85, and more especially from 99 to 95 parts. The number of parts (a)+(b) is 100 and all parts mentioned here are by weight.

Preferably component (a) is completely dissolved in component (b). Preferably component (a) has a solubility in component (b) at 20° C. of at least 10%. This allows the preparation of concentrates which may be used to prepare more dilute inks and reduces the chance of the compound(s) of component (a) of the ink precipitating if evaporation of the liquid medium occurs during storage.

When the liquid medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-miscible organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

A preferred liquid medium comprises:
(a) from 75 to 95 parts water; and
(b) from 25 to 5 parts in total of one or more solvents selected from diethylene glycol, 2-pyrrolidone, thiodiglycol, N-methylpyrrolidone, cyclohexanol, caprolactone, caprolactam and pentane-1,5-diol;
wherein the parts are by weight and the sum of the parts (a) and (b)=100.

Another preferred liquid medium comprises:
(a) from 60 to 80 parts water;
(b) from 2 to 20 parts diethylene glycol; and
(c) from 0.5 to 20 parts in total of one or more solvents selected from 2-pyrrolidone, N-methylpyrrolidone, cyclohexanol, caprolactone, caprolactam, pentane-1,5-diol and thiodiglycol;
wherein the parts are by weight and the sum of the parts (a), (b) and (c)=100.

Examples of further suitable ink media comprising a mixture of water and one or more organic solvents are described in U.S. Pat. Nos. 4,963,189, 4,703,113, 4,626,284 and EP 4,251,50A.

When the liquid medium comprises an organic solvent free from water, (i.e. less than 1% water by weight) the solvent preferably has a boiling point of from 30 to 200° C., more preferably of from 40 to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) and/or an alcohol (especially a $C_{1-4}$-alkanol, such as ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

An especially preferred ink comprises:
(a) from 1 to 10 parts in total of a compound or composition according to the first or second aspect of the invention;
(b) from 2 to 60, more preferably 5 to 40 parts of water-soluble organic solvent; and
(c) from 30 to 97, more preferably 40 to 85 parts water; wherein all parts are by weight and the sum of the parts (a)+(b)+(c)=100.

When the liquid medium in the ink comprises a mixture of water and an organic solvent; or an organic solvent free from water, component (a) of the ink may comprise a compound of the Formula (1), or salt thereof, as hereinbefore defined in relation to the first aspect of the invention.

Preferred low melting solid media have a melting point in the range from 60° C. to 125° C. Suitable low melting point solids include long chain fatty acids or alcohols, preferably those with $C_{18-24}$ chains, and sulphonamides. A dye of Formula (1) may be dissolved in the low melting point solid or may be finely dispersed in it.

The inks according to the present invention may also contain additional components conventionally used in ink jet printing inks, for example viscosity and surface tension modifiers, corrosion inhibitors, biocides, kogation reducing additives, anti-cockle agents to reduce paper curling and surfactants which may be ionic or non-ionic.

The pH of the ink is preferably from 4 to 11, more preferably from 7 to 10.

The viscosity of the ink at 25° C. is preferably less than 50 cP, more preferably less than 20 cP and especially less than 5 cP.

When the inks according to the invention are used as ink jet printing inks, the ink preferably has a concentration of less than 500 parts per million, more preferably less than 100 parts per million of halide ions. It is especially preferred that the ink has less than 100, more preferably less than 50 parts per million of divalent and trivalent metals, wherein parts refer to parts by weight relative to the total weight of the ink. We have found that purifying the inks to reduce the concentration of these undesirable ions reduces nozzle blockage in ink jet printing heads, particularly in thermal ink jet printers.

A fourth aspect of the present invention provides a process for printing an image on a substrate comprising applying thereto by means of an ink jet printer an ink containing a compound according to the first aspect of the invention or a composition according to the second aspect of the invention.

The ink used in this process is preferably as defined in the third aspect of the present invention.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper.

Preferred papers are plain or treated papers which may have an acid, alkaline or neutral character. Examples of commercially available papers include, HP Premium Coated Paper, HP Photopaper (all available from Hewlett Packard Inc.), Stylus Pro 720 dpi Coated Paper, Epson Photo Quality Glossy Film, Epson Photo Quality Glossy Paper (available from Seiko Epson Corp.), Canon HR 101 High Resolution Paper, Canon GP 201 Glossy Paper, Canon HG 101 High Gloss Film (all available from Canon Inc.), Wiggins Conqueror paper (available from Wiggins Teape Ltd), Xerox Acid Paper and Xerox Alkaline paper, Xerox Acid Paper (available from Xerox).

A fifth aspect of the present invention provides a substrate, preferably a paper, an overhead projector slide or a textile material, printed with an ink according to the third aspect of the present invention or by means of the process according to the fourth aspect of the present invention.

According to a sixth aspect of the present invention there is provided an ink jet printer cartridge comprising a chamber and ink, wherein the ink is present in the chamber and the ink contains a compound or a composition according to the first or second aspect of the present invention. Preferably the ink is as defined in the third aspect of the present invention.

According to a seventh aspect of the present invention there is provided an ink jet printer containing an ink jet printer cartridge, wherein the ink jet printer cartridge is as defined in the sixth aspect of the present invention.

The invention is further illustrated by the following Examples in which all parts and percentages are by weight unless otherwise stated.

EXAMPLE 1

Preparation of Compound (1) Wherein M is Nickel

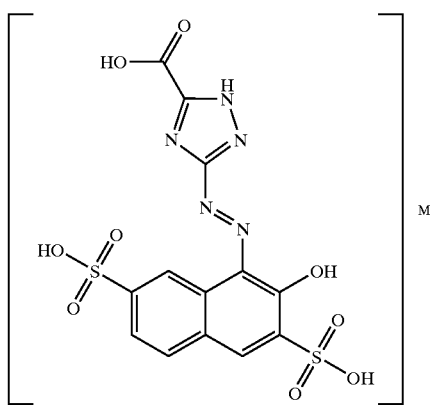

Compound (1)

Stage (a): Preparation of 3-hydroxynaphthalene-2,6-disulfonic Acid

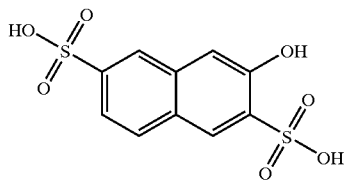

7-Hydroxynaphthalene-2-sulfonic acid (250 g, 1.16 mol) was added in portions to a mixture of concentrated $H_2SO_4$ (950 g) and water (50 g). The mixture was stirred at 110–120° C. for 3 hours, cooled to room temperature, added to a mixture of ice and water (5000 ml) and the product precipitated by the addition of sodium chloride. The resultant slurry was warmed to 90° C. to dissolve the product, stirred for 1 hour at this temperature and then allowed to cool. The product was filtered off and the damp product dissolved in water (3000 ml) at pH 10 by the addition of concentrated sodium hydroxide solution. The solution was then filtered to remove a small amount of insoluble material. The pH of the filtrate was lowered to 7 with concentrated HCl and the product precipitated by the addition sodium chloride. The product was filtered off and dried in a vacuum oven to give 117 g of a cream solid (68% yield).

Stage (b):

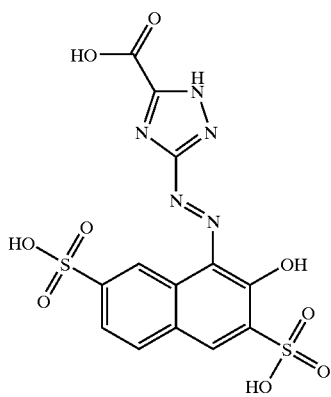

3-amino-1,2,4-triazole-5-carboxylic acid hydrate (3.84 g, 0.03 mol) was suspended in water (180 ml) and dissolved by the addition of 2M NaOH to pH 8. Sodium nitrite (2.27 g, 0.033 mol) was added and the solution stirred until the sodium nitrite had dissolved.

The mixture was then added dropwise to a cooled mix of ice-water (150 g) and concentrated HCl (10 ml) at 0–5° C., the mixture was stirred for 30 minutes at 0–5° C. and then excess nitrous acid was removed by adding sulphamic acid. The diazo suspension was added slowly to a solution of 3-hydroxynaphthalene-2,6-disulfonic acid (13.4 g, 0.03 mol) in water (300 ml) at pH 7–8 (2N NaOH) and cooled below 5° C. The reaction mixture was then stirred at 0–5° C. for one further hour, the product was precipitated by acidification to pH 4 with 2N HCl and collected by filtration. The product was washed with 15% brine solution and then dried in a vacuum desiccator to give 20 g of an orange solid (60% yield).

Stage (c): Preparation of Compound (1)

A solution of nickel acetate tetrahydrate (2.5 g, 0.01 mol) in water (20 ml) was added dropwise to the product from stage (b) (7.43 g, 0.01 mol) dissolved in water (100 ml) at pH 7–8 (2N NaOH). The reaction mixture was stirred for 2 hours at 20° C., dialysed using SpectraPor membrane tubing (molecular weight cut off 3500) to low conductivity (<100 $\mu$s). Compound (1) was obtained by evaporation under reduced pressure to afford a dark solid (5 g). Analysis by mass spectrometry found m/z 499 $(M-H)^-$. Requires $M^+=500$.

EXAMPLES 2 to 5

Compounds (2) to (5) of the Formula (11) were prepared using an analogous process to that described in Example 1 except that in stage (c) a metal salt as shown in Table 1 was used in place of nickel acetate.

TABLE 1

Formula (11)

| Example | Compound | Metal salt | M | Mass spectra analysis |
|---|---|---|---|---|
| 2 | (2) | Copper acetate | Cu | m/z 504 $(M - H)^-$ |
| 3 | (3) | Chromium acetate | Cr | m/z 934 $(M - H)^-$ |
| 4 | (4) | Zinc acetate | Zn | m/z 947 $(M - H)^-$ |
| 5 | (5) | Cobalt acetate | Co | m/z 941 $(M - H)^-$ |

EXAMPLES 6 TO 8

Compounds (6) to (8) of the Formula (12) described in Table 2 were prepared using an analogous process to that described in Example 1 except that in stage (b) in place of 3-amino-1,2,4-triazole-5-carboxylic acid there was used the triazole compound shown in Table 2. The name of the resultant Compound is shown in the third column of Table 2. M is nickel.

TABLE 2

Formula (12)

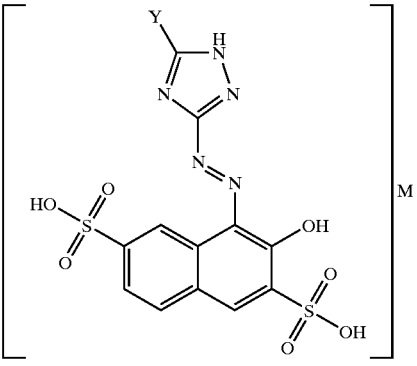

| Example | Triazole | Y | Compound name |
|---|---|---|---|
| 6 | 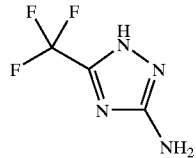 | CF$_3$ | Nickel chelate of [3-hydroxy-4-(5-trifluomethyl-1H-[1,2,4]triazole-3-ylazo)-naphthalene-2,7-disulfonic acid ("Compound (6)"). Analysis by mass spectrometry found m/z 989 (M − H)$^-$. |
| 7 | 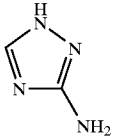 | H | Nickel chelate of [3-hydroxy-4-(1H-[1,2,4]triazole-3-ylazo)-naphthalene-2,7-disulfonic acid. ("Compound (7)"). Analysis by mass spectrometry found m/z 853 (M − H)$^-$. |
| 8 | 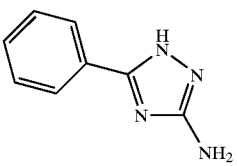 | C$_6$H$_5$ | Nickel chelate of [3-hydroxy-4-(5-phenyl-1H-[1,2,4]triazole-3-ylazo)-naphthalene-2,7-disulfonic acid. ("Compound (8)"). Analysis by mass spectrometry found m/z 1007 (M − H)$^-$. |

EXAMPLE 9

Compound (9) of the Formula (13) described in Table 3 was prepared using an analogous process to that described in Example 1 except that in stage (b) in place of 3-hydroxynaphthalene-2,6-disulfonic acid there was used 2-hydroxynaphthalene-3,6-disulfonic acid.

Compounds (10) and (11) of the Formula (13) described in Table 3 were prepared using an analogous process to that described in Example 1 except that in stage (b) in place of 3-hydroxynaphthalene-2,6-disulfonic acid there was used 2-hydroxynaphthalene-3,6-disulfonic acid and in place of 3-amino-1,2,4-triazole-5-carboxylic acid there was used the amino triazole compound shown in Table 3.

TABLE 3

Formula (13)

| Example | Triazole | Y | Dye name |
|---|---|---|---|
| 9 | | $CO_2H$ | Nickel chelate of [5-(2-hydroxy-3,6-disulfo-naphthalen-1-ylazo)-2H-[1,2,4]triazole-3-carboxylic acid]. ("Compound (9)"). Analysis by mass spectrometry found m/z 941 (M − H)⁻. |
| 10 | | SH | Nickel chelate of [3-hydroxy-4-(5-mercapto-1H-[1,2,4]triazole-3-ylazo)-naphthalene-2,7-disulfonic acid]. ("Compound (10)"). |
| 11 | | $SCH_3$ | Nickel chelate of [3-hydroxy-4-(5-methylsulfanyl-1H-[1,2,4]triazole-3-ylazo)-naphthalene-2,7-disulfonic acid]. ("Compound (11)"). Analysis by mass spectrometry found m/z 501 (M − H)⁻. |

EXAMPLE 12

Compound (12) Wherein M is Copper:

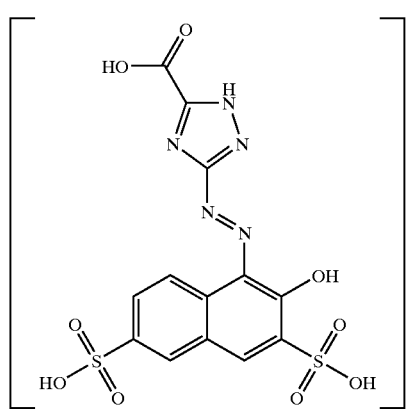

Compound (12)

Compound (12) was prepared using an analogous process to that described in Example 1 except that in stage (b) 2-hydroxynaphthalene-3,6-disulfonic acid was used in place of 3-hydroxynaphthalene-2,6-disulfonic acid and in stage (c) copper acetate was used in place of nickel acetate.

EXAMPLE 13

Preparation of Compound (13) Wherein M is Nickel:

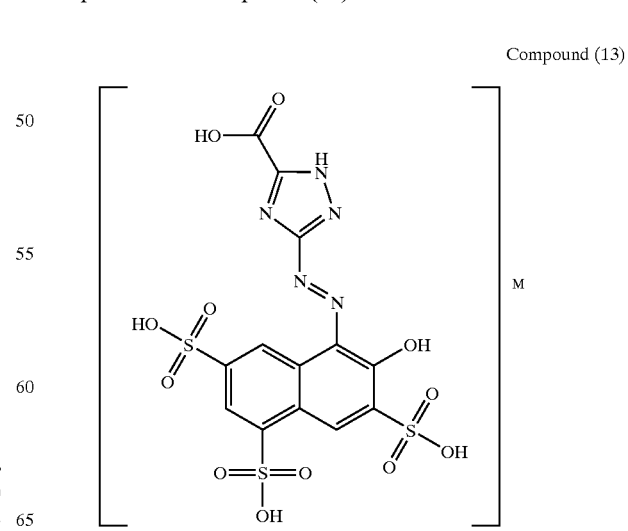

Compound (13)

Stage (a):

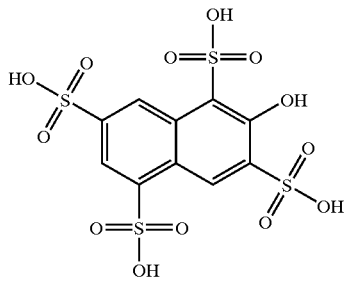

The product of Example 1 stage (a) (5 g), (0.016 mol) was added in portions during the course of 30 minutes to 27% oleum (10 ml) with stirring at room temperature. A second portion of 27% oleum (10 ml) was added and the reaction mixture stirred overnight at room temperature. The reaction mixture was then stirred for 3.5 hours at 120° C., cooled and the product collected by filtration using a sintered funnel and washed with concentrated $H_2SO_4$ (5 ml). The crude product was dissolved in water (20 ml) and precipitated by the addition of sodium chloride. The solid was collected by filtration and dried to give a pale pink solid.

Stage (b): Preparation of Compound (13) Wherein M is Nickel:

Compound (13)

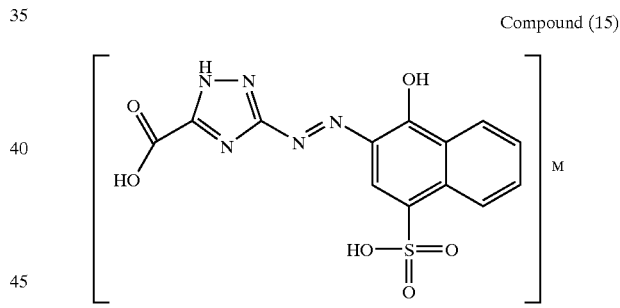

The Compound (13) was prepared using an analogous process to that described in Example 1 except that in stage (b) 2-hydroxy-naphthalene-1,3,5,7-tetrasulphonic acid was used in place of 3-hydroxynaphthalene-2,6-disulfonic acid. Analysis by mass spectrometry found m/z 579 (M−H)⁻.

EXAMPLE 14

Preparation of Compound (14) Wherein M is Nickel:

Compound (14)

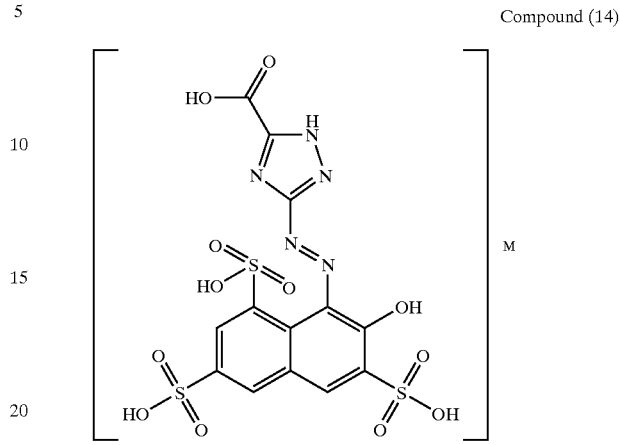

Compound (14) was prepared using an analogous process to that described in Example 1 except that in stage (b) 7-hydroxynaphthalene-1,3,6-trisulfonic acid was used in place of 3-hydroxynaphthalene-2,6-disulfonic acid. Analysis by mass spectrometry found m/z 1101 (M−H)⁻.

EXAMPLE 15

Preparation of Compound (15) Wherein M is Nickel:

Compound (15)

Stage (a): Preparation of 5-(1-hydroxy-4-sulfo-naphthalen-2-ylazo)-2H-[1,2,4]triazole

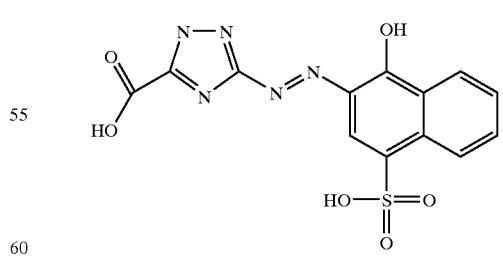

3-amino-1,2,4-triazole-5-carboxylic acid hydrate (1.28 g, 0.01 mol) was suspended in water (50 ml) and dissolved by the addition of 2M NaOH to pH 8. Sodium nitrite (0.76 g, 0.11 mol) was added and the solution stirred until the sodium nitrite had dissolved.

The mixture was then added dropwise to a cooled mix of ice-water (30 g) and concentrated HCl (3.0 ml) at 0–5° C., the mixture was stirred for 30 minutes at 0–5° C. and then excess nitrous acid was removed by adding sulphamic acid. The diazo suspension was added slowly to a solution of 4-hydroxy-naphthalene-1-sulfonic acid sodium salt (2.46 g, 0.01 mol) in water (100 ml) at pH 10–10.5 (2N NaOH) and cooled below 5° C. The reaction mixture was then stirred at 0–5° C. for one further hour, the product was precipitated by acidification to pH 4 with 2N HCl and collected by filtration. The product was washed with water and then dried in a vacuum desiccator to give 2.9 g of an orange solid.

Stage (b): Preparation of Compound (15):

A solution of nickel acetate tetrahydrate (1.3 g, 0.005 mol) in water (10 ml) was added dropwise to the product from stage (a) (1.9 g, 0.005 mol) dissolved in water (100 ml) at pH 7–8 (2N NaOH). The reaction mixture was stirred for 2 hours at 20° C., dialysed using SpectraPor membrane tubing (molecular weight cut off 3500) to low conductivity (<100 µs). The product was obtained by evaporation under reduced pressure to afford a dark solid (1.7 g). Analysis by mass spectrometry found m/z 781 (M–H)⁻.

EXAMPLES 16 & 17

Compounds (16) and (17) described in Table 4 of the Formula (14) were prepared using an analogous process to that described in Example 15 except that in stage (b) the metal salt (M) shown in Table 4 was used in place of nickel acetate.

TABLE 4

Formula (14)

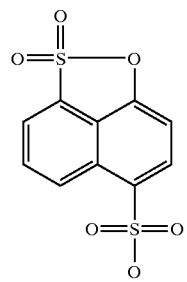

| Example | Compound | Metal salt | M | Mass spectra analysis. |
|---|---|---|---|---|
| 16 | (16) | Cobalt acetate | Co | m/z 781 (M − H)⁻ |
| 17 | (17) | Chromium acetate | Cr | m/z 827 (M − H)⁻ |

EXAMPLE 18
Preparation of Compound (18) Wherein M is Nickel:

Compound (18)

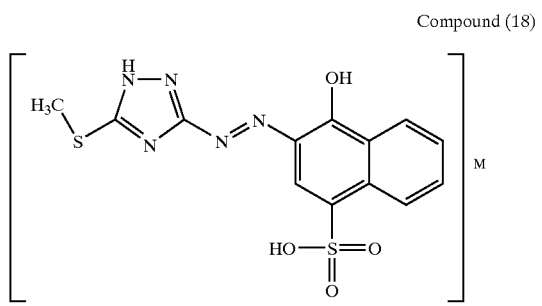

Compound (18) was prepared using an analogous process to that described in Example 15 except that in stage (a) 3-amino-5-methylthio-1,2,4-triazole was used in place of 3-amino-1,2,4-triazole-5-carboxylic acid. Analysis by mass spectrometry found m/z 785 (M–H)⁻.

EXAMPLE 19
Preparation of Compound (19) Wherein M is Nickel:

Compound (19)

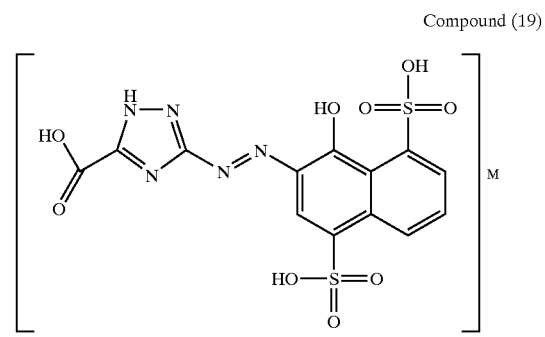

Stage (a):

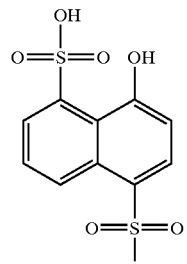

1,8-Naphthosultone (25.0 g, 0.119 mol) was added in portions to concentrated sulphuric acid (75 ml), the reaction mixture was then stirred for 2 hours at 80° C. and then added to a mixture of ice (70 g) and water (20 ml). Anhydrous sodium sulfate (46 g) was added in portions to the reaction mixture at 30° C., the product was collected by filtration and then dissolved in water (120 ml) at 50° C. The product was precipitated by the addition of sodium chloride (25% w/v), stirred at 40° C. for 1 hour and then collected by filtration. The solid was dried in a vacuum oven to give 30 g of a pink solid (76%).

Stage (b)—Preparation of 4-hydroxy-1,5-disulphonaphthalene:

The product from stage (a) (30 g) was dissolved in water (200 ml) at pH 11 by the addition of 2N sodium hydroxide. The solution was stirred at room temperature for 2 hrs to complete the hydrolysis and the solution of the product used in the next stage without isolation.

Stage (c)

Compound (19) was prepared using an analogous process to that described in Example 15 except that in the process of Example 15, stage (a), 4-hydroxy-1,5-disulphonaphthalene acid was used in place of 4-hydroxy-naphthalene-1-sulfonic acid. Analysis by mass spectrometry found m/z 941 (M–H)⁻.

EXAMPLES 20 & 21

Compounds (20) and (21) described in Table 5 of the Formula (15) were prepared using an analogous process to that described in Example 15 except that in stage (a) 4-hydroxy-naphthalene-1,5-disulfonic acid was used in place of 4-hydroxy-naphthalene-1-sulfonic acid and in place of 3-amino-1,2,4-triazole-5-carboxylic acid the amino triazole compound shown in Table 5 was used.

TABLE 5

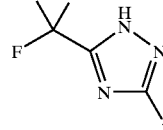

Formula (15)

| Example | Y | Triazole | Dye name |
|---|---|---|---|
| 20 | —CF₃ | 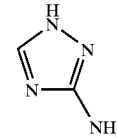 | Nickel chelate of [4-hydroxy-3-(5-trifluoromethyl-1H-[1,2,4]triazole-3-ylazo)-naphthalene-1,5-disulfonic acid]. ("Compound (20)"). Analysis by mass spectrometry found m/z 989 (M – H)⁻. |
| 21 | —H | 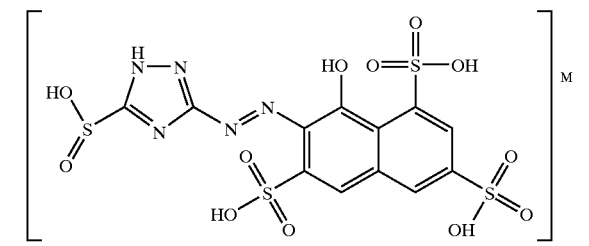 | Nickel chelate of [4-hydroxy-3-(1H-[1,2,4]triazol-3-ylazo)-naphthalene-1,5-disulfonic acid]. ("Compound (21)"). Analysis by mass spectrometry found m/z 853 (M – H)⁻. |

EXAMPLE 22

Preparation of Compound (22) Wherein M is Nickel:

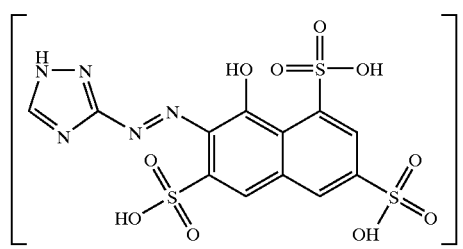

Compound (22)

Compound (22) was prepared using an analogous process to that described in Example 15 except that in stage (a) 8-hydroxy-naphthalene-1,3,6-trisulfonic acid was used in place of 4-hydroxy-naphthalene-1-sulfonic acid. Analysis by mass spectrometry found m/z 1157 (M–H)⁻.

EXAMPLE 23

Preparation of Compound (23) Wherein M is Nickel:

Compound (23)

Compound (23) was prepared using an analogous process to that described in Example 15 except that in stage (a) 8-hydroxy-naphthalene-1,3,6-trisulfonic acid was used in place of 4-hydroxy-naphthalene-1-sulfonic acid and 3-amino-1,2,4-triazole was used in place of 3-amino-1,2,4-triazole-5-carboxylic acid. Analysis by mass spectrometry found m/z 534 (M–H)⁻.

Inks

The inks described in Tables I and II may be prepared wherein the Compound described in the first column is the Compound made in the above Examples of the same number. Numbers quoted in the second column onwards refer to the number of parts of the relevant ingredient and all parts are by weight. The inks may be applied to paper by thermal or piezo ink jet printing.

The following abbreviations are used in Table I and II:

PG=propylene glycol

DEG=diethylene glycol

NMP=N-methyl pyrollidone

DMK=dimethylketone

IPA=isopropanol

MEOH=methanol

2P=2-pyrollidone

MIBK=methylisobutyl ketone

P12=propane-1,2-diol

BDL=butane-2,3-diol

CET=cetyl ammonium bromide

PHO=Na₂HPO₄ and

TBT=tertiary butanol

TDG=thiodiglycol

TABLE I
| Compound | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 3 | | 3 | 3 | | | | 5 | 1 | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 5 | 65 | | 20 | | | | | 10 | | | |
| 9 | 2.4 | 75 | 5 | 4 | | 5 | | | | 6 | | 5 |
| 10 | 4.1 | 80 | 3 | 5 | 2 | 10 | | 0.3 | | | | |
| 11 | 3.2 | 65 | | 5 | 4 | 6 | | | 5 | 4 | 6 | 5 |
| 12 | 5.1 | 96 | | | | | | | | 4 | | |
| 13 | 10.8 | 90 | 5 | | | | | | 5 | | | |
| 14 | 10.0 | 80 | 2 | 6 | 2 | 5 | | | 1 | | 4 | |
| 15 | 1.8 | 80 | | 5 | | | | | | | 15 | |
| 16 | 2.6 | 84 | | | 11 | | | | | 5 | | |
| 17 | 3.3 | 80 | 2 | | | 10 | | | | 2 | | 6 |
| 18 | 12.0 | 90 | | | 7 | | 0.3 | | 3 | | | |
| 19 | 5.4 | 69 | 2 | 20 | 2 | 1 | | | | | 3 | 3 |
| 20 | 6.0 | 91 | | | 4 | | | | | | 5 | |
TABLE II
| Compound | Dye Content | Water | PG | DEG | NMP | CET | TBT | TDG | BDL | PHO | 2P | PI2 |
|---|---|---|---|---|---|---|---|---|---|---|---|---|
| 21 | 3.0 | 80 | 15 | | | 0.2 | | | | | 5 | |
| 22 | 9.0 | 90 | | 5 | | | | | | 1.2 | | 5 |
| 23 | 1.5 | 85 | 5 | 5 | | 0.15 | 5.0 | 0.2 | | | | |
| 4 | 2.5 | 90 | | 6 | 4 | | | | | 0.12 | | |
| 5 | 3.1 | 82 | 4 | 8 | | 0.3 | | | | | | 6 |
| 1 | 0.9 | 85 | | 10 | | | | | 5 | 0.2 | | |
| 7 | 8.0 | 90 | | 5 | 5 | | | 0.3 | | | | |
| 8 | 4.0 | 70 | | 10 | 4 | | | | 1 | | 4 | 11 |
| 9 | 2.2 | 75 | 4 | 10 | 3 | | | | 2 | | 6 | |
| 10 | 10.0 | 91 | | | 6 | | | | | | 3 | |
| 1 | 9.0 | 76 | | 9 | 7 | | 3.0 | | | 0.95 | 5 | |
| 12 | 5.0 | 78 | 5 | 11 | | | | | | | 6 | |
| 13 | 5.4 | 86 | | | 7 | | | | | | 7 | |
| 20 | 2.1 | 70 | 5 | 5 | 5 | 0.1 | 0.2 | 0.1 | 5 | 0.1 | 5 | |
| 15 | 2.0 | 90 | | 10 | | | | | | | | |
| 1 | 2 | 88 | | | | | | 10 | | | | |
| 2 | 5 | 78 | | | 5 | | | 12 | | | 5 | |
| 1 | 8 | 70 | 2 | | 8 | | | 15 | | | 5 | |
| 1 | 10 | 80 | | | | | | 8 | | | 12 | |
| 1 | 10 | 80 | | | 10 | | | | | | | |
What is claimed is:
1. A compound of Formula (5) or (6):
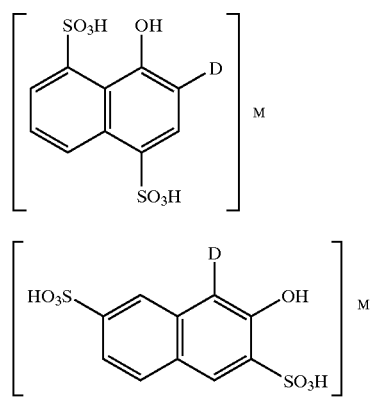
Formula (5)
Formula (6)
wherein:
M is a metal; and
D is a group of Formula (2a), (2b), (2c), (2d) or (2e):
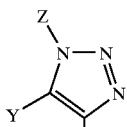
Formula (2a)
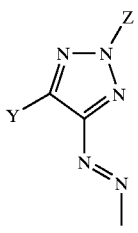
Formula (2b)

-continued

Formula (2c)

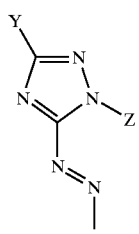

Formula (2d)

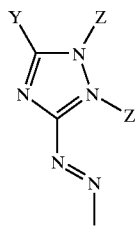

Formula (2e)

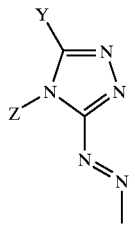

wherein:

Z is H, —OH, —Br, —Cl, —F, —CN, —NO$_2$, —PO$_3$H$_2$, —SO$_3$H, —CO$_2$H, optionally substituted phosphoramide, optionally substituted alkyl, optionally substituted alkenyl, optionally substituted alkynyl, optionally substituted aryl, optionally substituted aralkyl, —SR$^1$, —SO$_2$R$^1$, —SO$_2$NR$^2$R$^3$, —SOR$^1$, —OR$^1$, —C(O)R$^1$, —C(O)OR$^1$, —C(O)R$^2$R$^3$, —NR$^2$R$^3$, —NHCOR$^1$; and Y is —CF$_3$ or any one of the groups defined for Z; and wherein:

R$^1$, R$^2$ and R$^3$ are each independently H, optionally substituted alkyl, optionally substituted alkenyl, optionally substituted alkynyl, optionally substituted aryl or optionally substituted aralkyl; or R$^2$ and R$^3$ together with the nitrogen to which they are attached form an optionally substituted 5- or 6- membered ring.

2. A compound according to claim 1 wherein Y is CO$_2$H or H and Z is H.

3. A compound according to claim 1 or 2 wherein M is nickel.

4. A compound according to claim 1 having any one of the following formulae or a salt thereof, wherein M is nickel:

Compound (1)

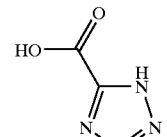

Compound (19)

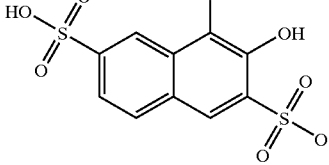

5. A compound according to claim 1 having the following formulae or a salt thereof, wherein M is nickel:

Compound (1)

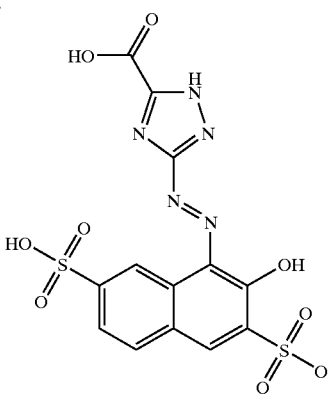

6. A composition comprising:
   (a) one or more compound according to any one of claims 2, 4 and 5; and
   (b) one or more water-soluble dye other than a compound according to claim 1.

7. An ink comprising:
   (a) a compound according to any one of claims 2, 4 and 5; and
   (b) a liquid medium.

8. An ink according to claim 7 wherein the liquid medium comprises a mixture of water and an organic solvent.

9. A process for printing an image on a substrate comprising applying thereto by means of an ink jet printer an ink according to claim 7.

10. A substrate printed by means of the process according to claim 9.

11. An ink jet printer cartridge comprising a chamber and ink, wherein the ink is present in the chamber and the ink is as defined in claim 7.

12. An ink jet printer containing an ink jet printer cartridge, wherein the ink jet printer cartridge is as defined in claim 11.

* * * * *

UNITED STATES PATENT AND TRADEMARK OFFICE
CERTIFICATE OF CORRECTION

PATENT NO.       : 6,979,364 B2
APPLICATION NO.  : 10/441286
DATED            : December 27, 2005
INVENTOR(S)      : Gavin Wright et al.

It is certified that error appears in the above-identified patent and that said Letters Patent is hereby corrected as shown below:

In column 25, lines 51-61, delete the present structure for Compound (22)

"
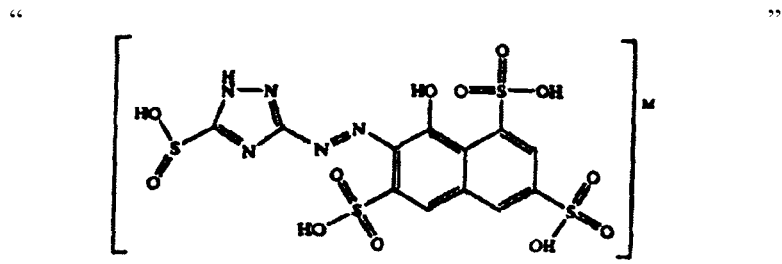
"

and add the following structure (the only difference being the presence of carbon rather than sulfur in the group furthest from the napthalene portion of the structure)

--
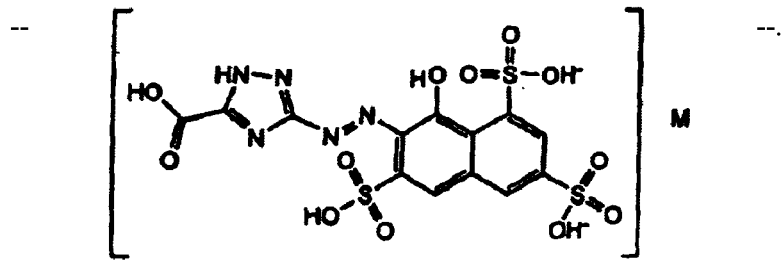
--.

UNITED STATES PATENT AND TRADEMARK OFFICE
CERTIFICATE OF CORRECTION

PATENT NO.       : 6,979,364 B2
APPLICATION NO.  : 10/441286
DATED            : December 27, 2005
INVENTOR(S)      : Gavin Wright et al.

It is certified that error appears in the above-identified patent and that said Letters Patent is hereby corrected as shown below:

In claim 1 at column 29, lines 11-21, delete the present structure for formula (2d)

"
"

and add the following structure (the only difference being the deletion of one of the –Z groups)

--
--.

Signed and Sealed this

Twenty-fourth Day of October, 2006

JON W. DUDAS
*Director of the United States Patent and Trademark Office*